June 30, 1942.　　P. B. HOYE　　2,288,134
SWITCH
Filed April 6, 1940　　8 Sheets-Sheet 1

Inventor:
Peder B. Hoye.
By Brown, Jackson, Boettcher & Dienner
Atty's.

June 30, 1942.  P. B. HOYE  2,288,134
SWITCH
Filed April 6, 1940  8 Sheets-Sheet 2
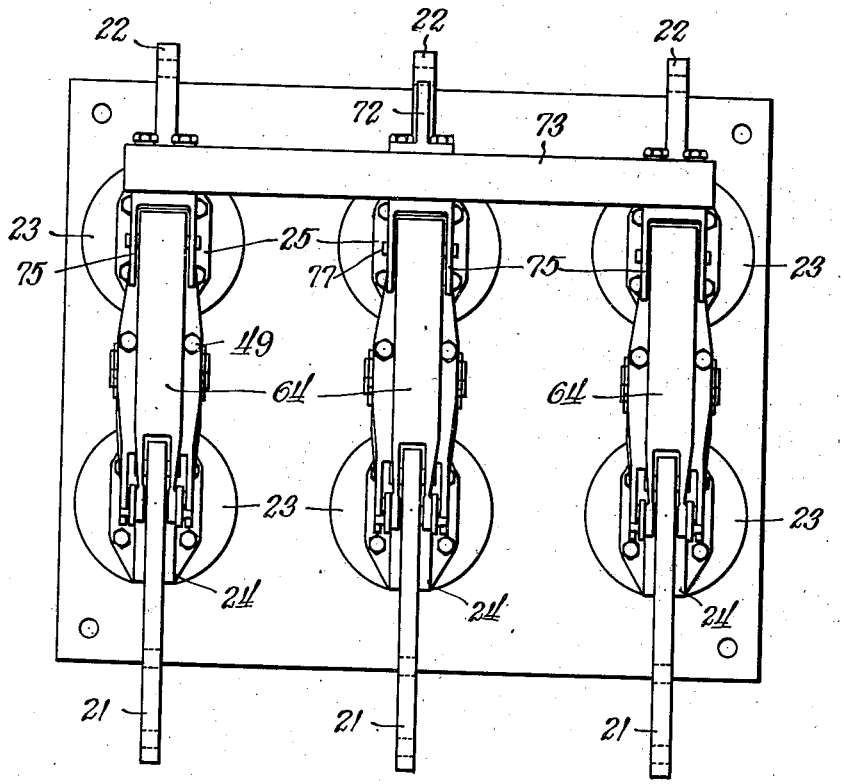
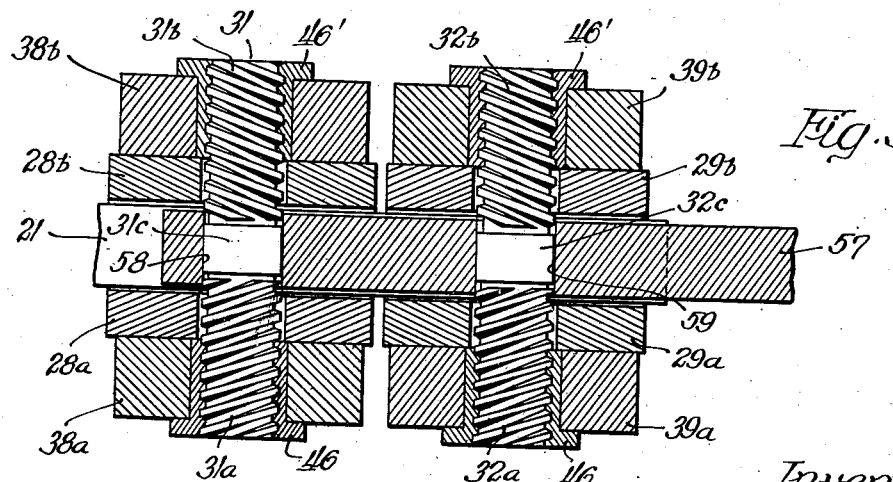
Inventor:
Peder B. Hoye.
By Brown, Jackson, Boettcher & Dienner.
Attys.

June 30, 1942.   P. B. HOYE   2,288,134
SWITCH
Filed April 6, 1940   8 Sheets-Sheet 3

Inventor:
Peder B. Hoye.
By Brown, Jackson, Boettcher & Dienner
Attys.

June 30, 1942.  P. B. HOYE  2,288,134
SWITCH
Filed April 6, 1940   8 Sheets-Sheet 4
Fig. 6.
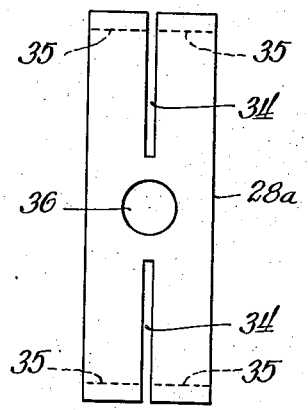
Fig. 7.
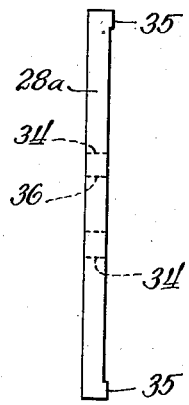
Fig. 8.
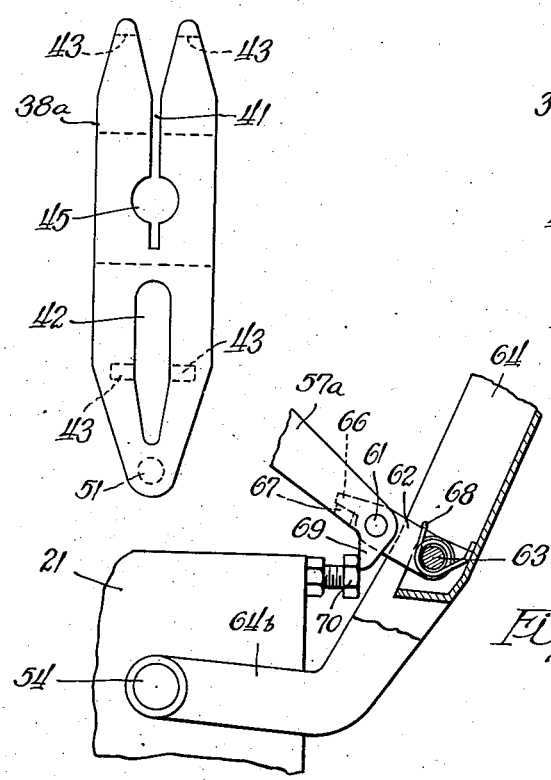
Fig. 9.
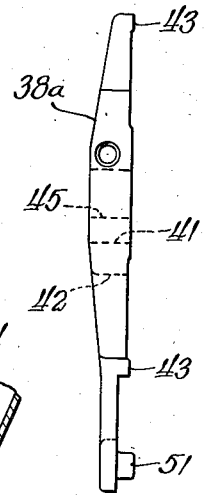
Fig. 10.
Inventor:
Peder B. Hoye.
By Brown, Jackson, Boettcher & Dienner.
Attys.

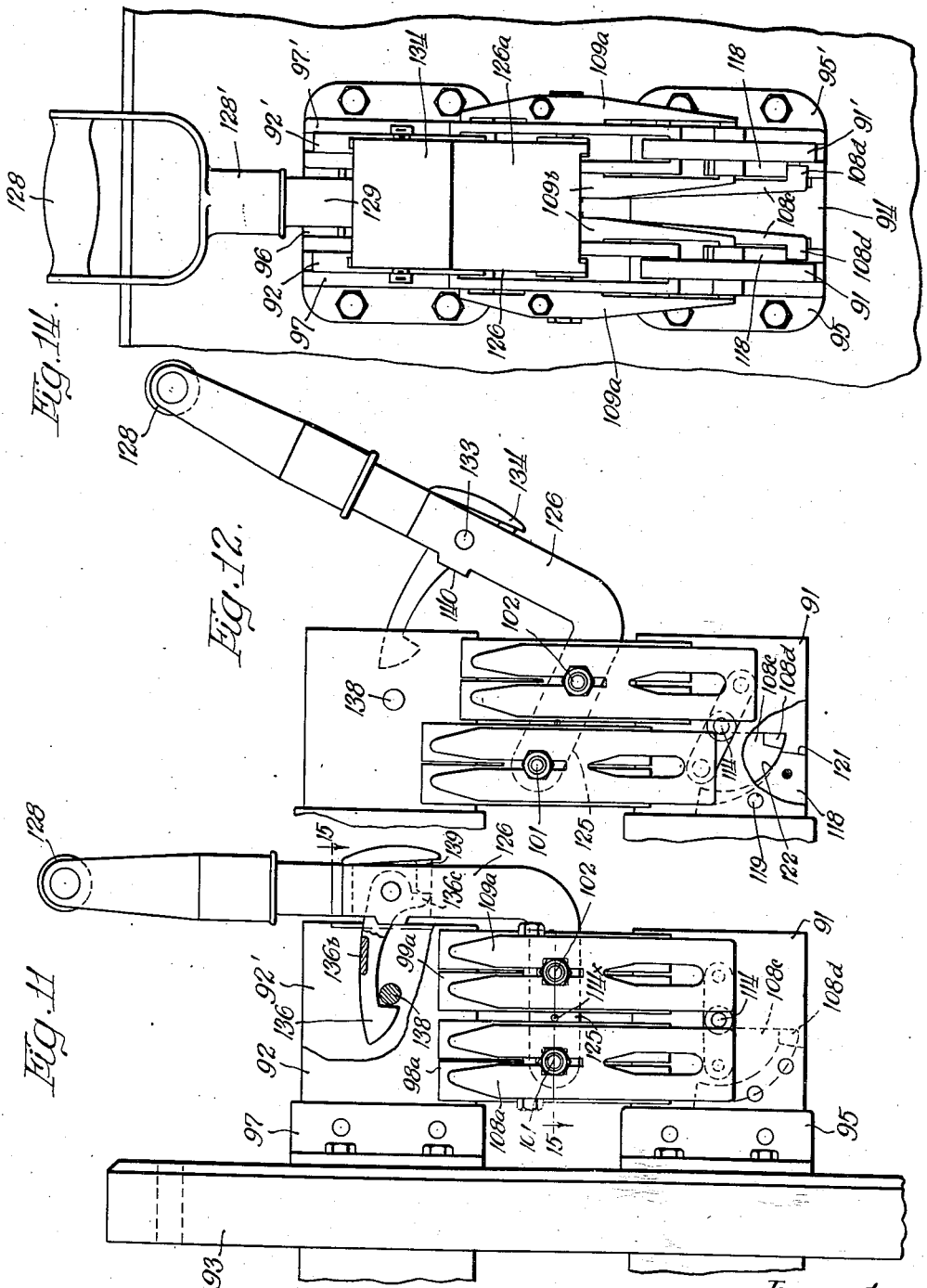

June 30, 1942.　　P. B. HOYE　　2,288,134
SWITCH
Filed April 6, 1940　　8 Sheets-Sheet 6

Inventor.
Peder B. Hoye.
By Brown, Jackson, Boettcher & Dienner.
Attys.

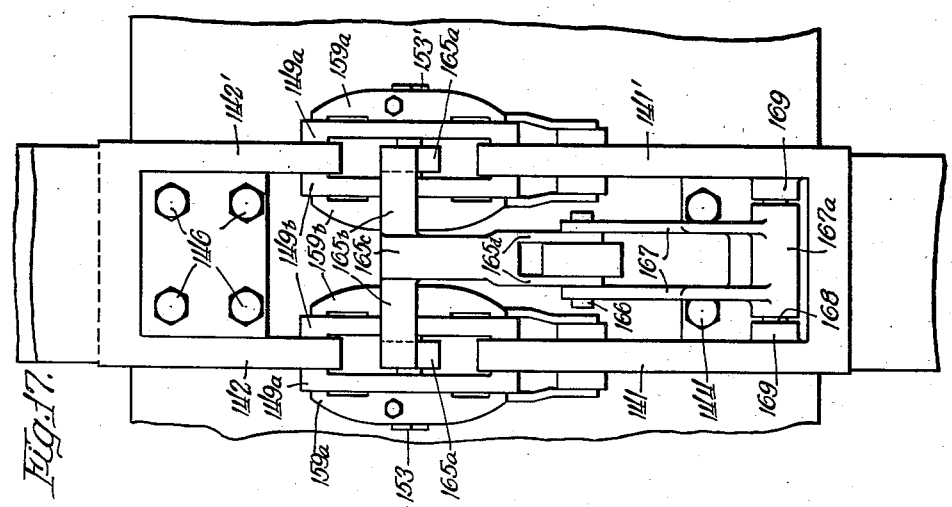
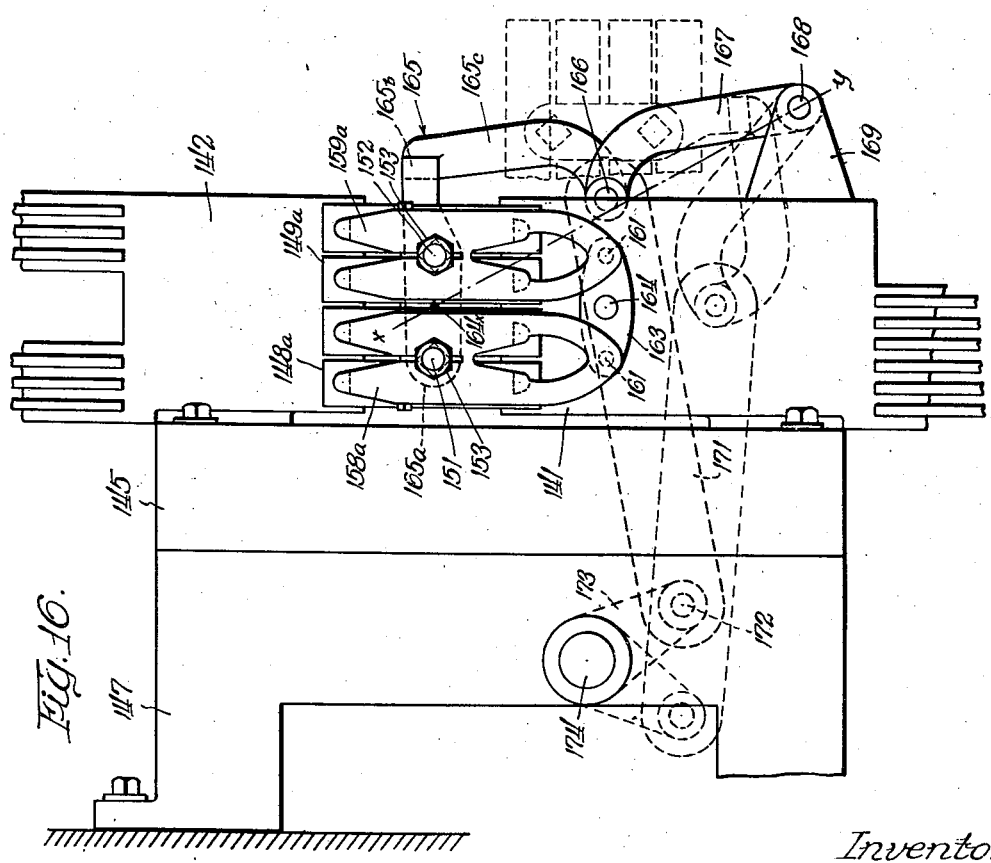

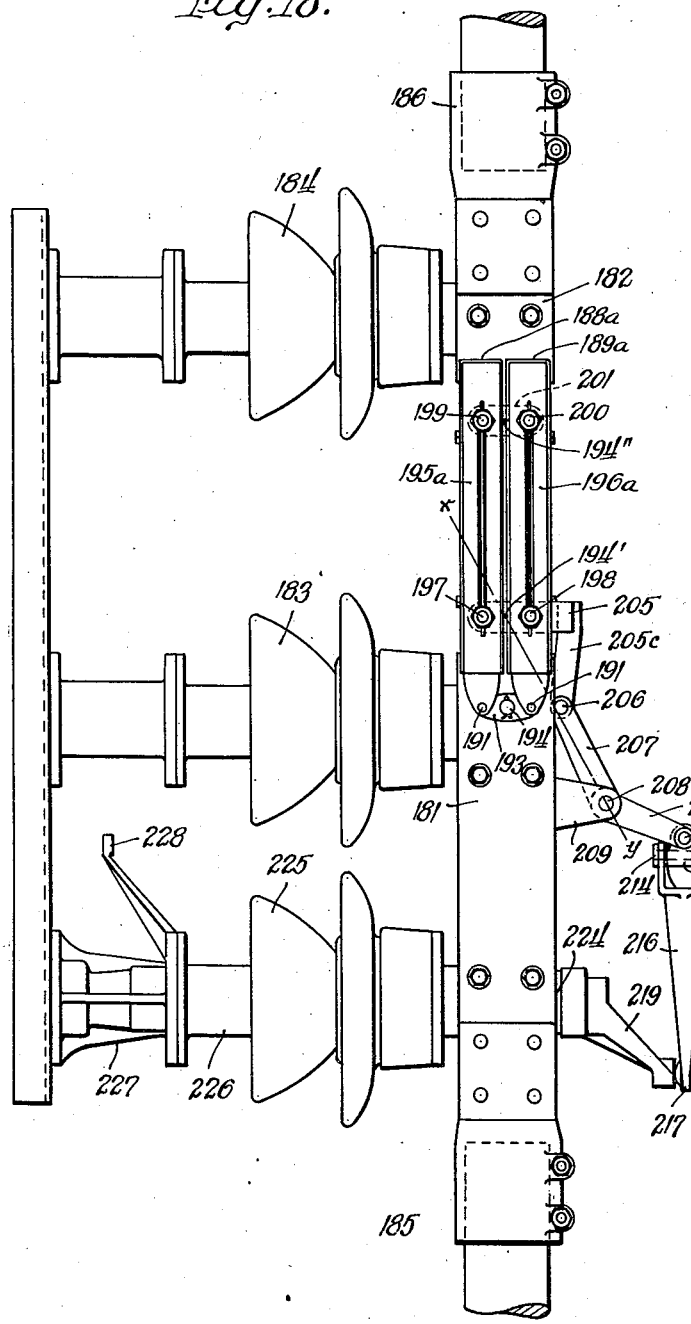
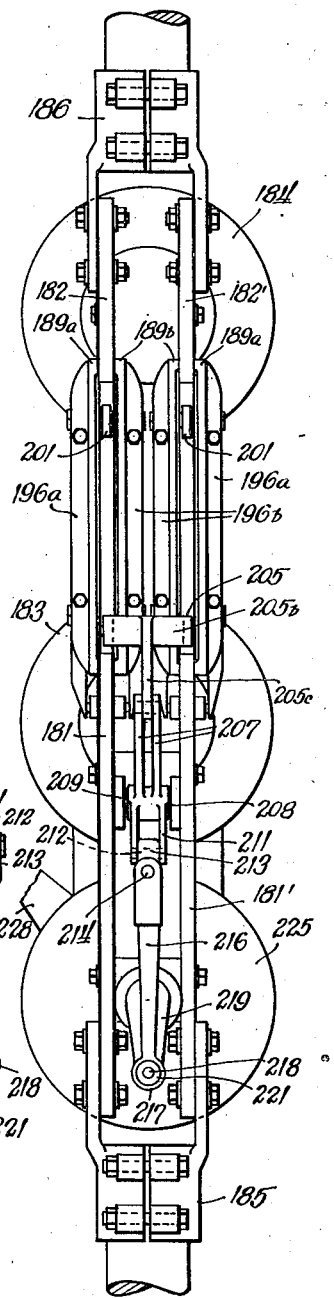

Patented June 30, 1942

2,288,134

UNITED STATES PATENT OFFICE 2,288,134

SWITCH

Peder B. Hoye, Maywood, Ill., assignor to Electrical Engineers Equipment Company, Melrose Park, Ill., a corporation of Illinois Application April 6, 1940, Serial No. 328,344

39 Claims. (Cl. 200—162)

The present invention relates generally to electrical switches, and more particularly to switches of the type (1) in which a high pressure of engagement per unit area is established between the coacting switch surfaces; and (2) in which a wiping or scraping motion is caused to occur between these surfaces during or immediately following the establishment of the high pressure engagement.

High pressure engagement has distinct advantages, particularly in switches for high amperage loads. For example, the resistance of the metal-to-metal contact is minimized, overheating is avoided, and the deleterious influence on the contact surfaces of sleet, rain, snow, and corrosive fumes in industrial plants, etc., is minimized.

Wiping or scraping motion also has distinct advantages, particularly in cooperation with high pressure engagement. A switch standing open for a substantial interval is very likely to collect dust, dirt, weather or corrosive accumulations on the coacting contact surfaces. Merely bringing these surfaces together under high pressure is not adequate to clean the surfaces of such accumulations. However, by causing a relative wiping or scraping motion between the surfaces, either while they are being brought into pressure engagement or immediately thereafter, these accumulations of foreign matter can be displaced so that clean contacting surfaces of maximum effectiveness are obtained.

The principal feature of the present invention resides in the provision of improved operating mechanism for obtaining this high pressure engagement between the switch surfaces, and also for obtaining the wiping or scraping action therebetween. In the preferred embodiment of the invention, the high pressure engagement is obtained by an improved relation of screw thread apparatus comprising threaded studs and cooperating nuts which are caused to have relative rotation in one direction during the closing of the switch for exerting a clamping pressure, and which are caused to have relative rotation in the opposite direction during the opening of the switch for releasing the clamping pressure. This screw thread mechanism enables the switch to be made much narrower and more compact than when using toggle or linkage mechanism. The screw thread mechanism also results in an improved switch design in which pairs of laterally spaced blade elements are drawn towards each other, into high pressure clamping engagement against the opposite sides of switch terminals lying between said blade elements.

The operating mechanism also includes improved shifting means for causing endwise wiping or scraping motion of the blade elements relative to the switch terminals. Preferably, each blade unit or blade assembly comprises a plurality of blade elements, and this improved shifting means is operative to impart differential motion to these elements, causing one element to shift endwise in one direction and another element to shift endwise in the other direction, during each operation of closing the switch or opening the switch. The screw threaded clamping means is preferably interrelated with this improved shifting means whereby clamping action and shifting action occur substantially simultaneously in the operation of the switch.

Another feature of the invention resides in the provision of improved timing means for timing the operation of the shifting and clamping means with respect to the pivotal swinging movement of the blade assembly between open and closed positions. It will be understood from the foregoing that the blade elements have three motions: (1) The pivotal swinging motion between open and closed positions of the switch; (2) the endwise shifting motion of the blade elements for obtaining the wiping or scraping action; and (3) the transverse clamping motion which results in the high pressure engagement of the blade elements with the stationary switch contacts or terminals. The improved timing means governs the shifting means and the screw clamping means so that as the blade assembly swings toward switch closing position the shifting motion and clamping motion do not occur until the blade elements are in position to effect their sliding and clamping engagement with the stationary contacts. Likewise, in the operation of opening the switch, the shifting and clamping motions occur initially to free the blade elements from the stationary contacts before the blade assembly starts its pivotal swinging motion toward open position.

Another feature of the invention pertains to improved locking means for the switch. This improved locking means may be a part of the timing means, or of the operating means, or it may be a separate instrumentality. This improved locking means functions to prevent accidental opening of the switch as a result of short circuits, vibration or other abnormal influences.

Other features, objects, and advantages of the invention will appear in the following detail description of certain preferred embodiments of the invention. In the accompanying drawings illustrating said embodiments:

Figure 2 is a front elevational view showing this embodiment in a three pole construction.

Figure 3 is a sectional view through the screw clamping mechanism, taken approximately on the plane of the line 3—3 of Figure 1.

Figures 6 and 7 are front elevational and side elevational views respectively of one of the blade elements.

Figures 8 and 9 are front elevational and side elevational views respectively of one of the clamping members.

Figure 10 is a detail view of the toggle and timing mechanism of the switch.

Figure 11 is a side elevational view, partly broken away, showing another embodiment of my invention;

Figure 12 is a similar view showing the initial stage of opening the switch.

Figure 14 is a front elevational view of the switch in its closed position.

Figure 16 is a side elevational view showing another embodiment of the invention, illustrating the blade assembly in its open position in dotted lines.

Figure 17 is a front elevational view of the switch in its closed position.

Figure 18 is a side elevational view of another embodiment of the invention; and Figure 19 is a front elevational view of the latter.

Figure 1:
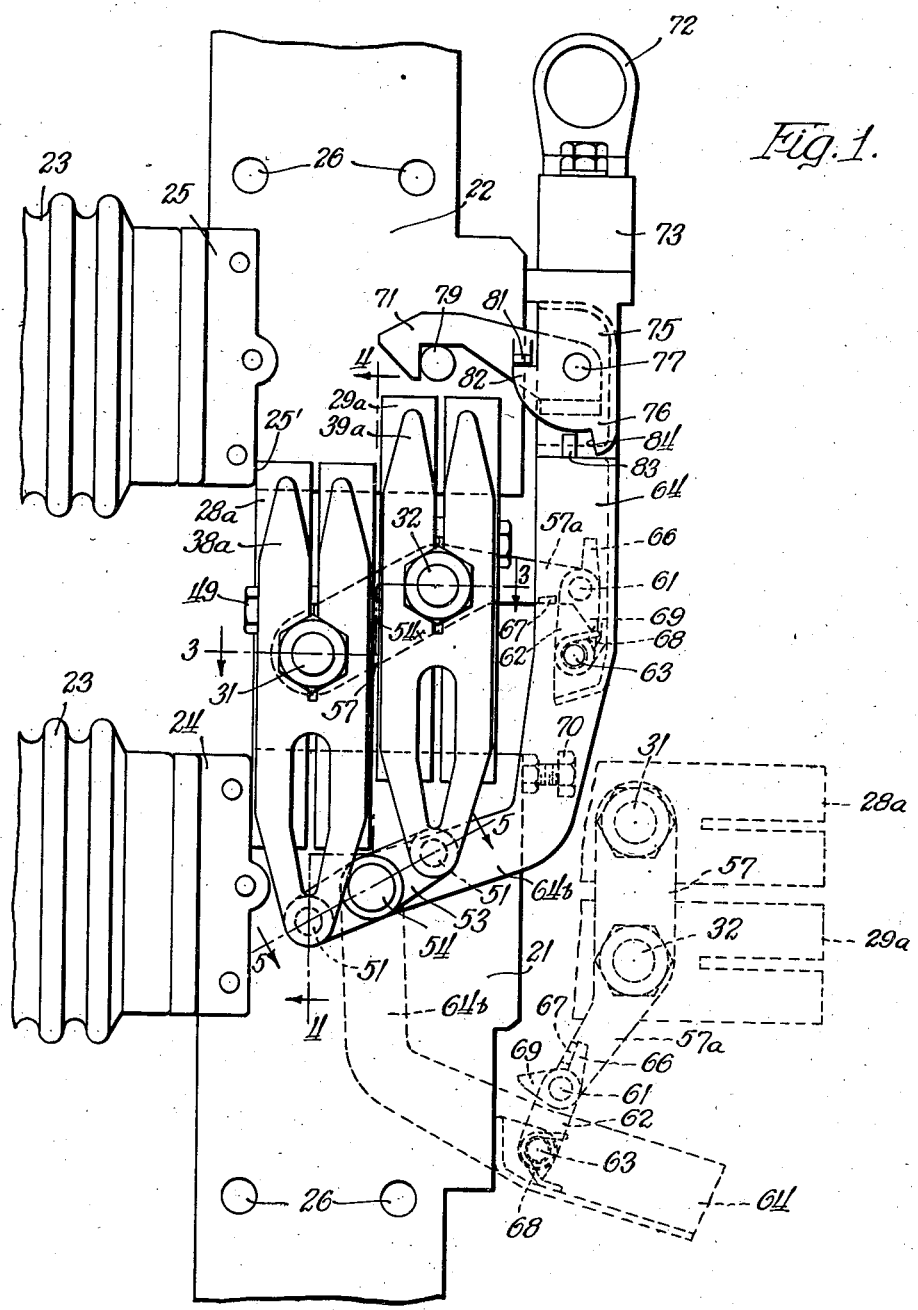
Figure 1 is a side elevational view of one embodiment of my improved switch, illustrating the blade assembly in its open position in dotted lines.

Referring first to the embodiment illustrated in Figures 1 to 5, inclusive, the switch assembly for any single phase or single circuit comprises the hinge terminal clip 21 and the front terminal clip 22, both mounted on insulators 23 or on any other suitable insulating support. In the exemplary arrangement illustrated, the terminals or clips are riveted to metallic end heads 24 and 25 which are bolted to the ends of the insulators. Each switch terminal or clip comprises a connector portion 21a and 22a to which the bus bars or other conductors are bolted through the holes 26.

Figure 4:
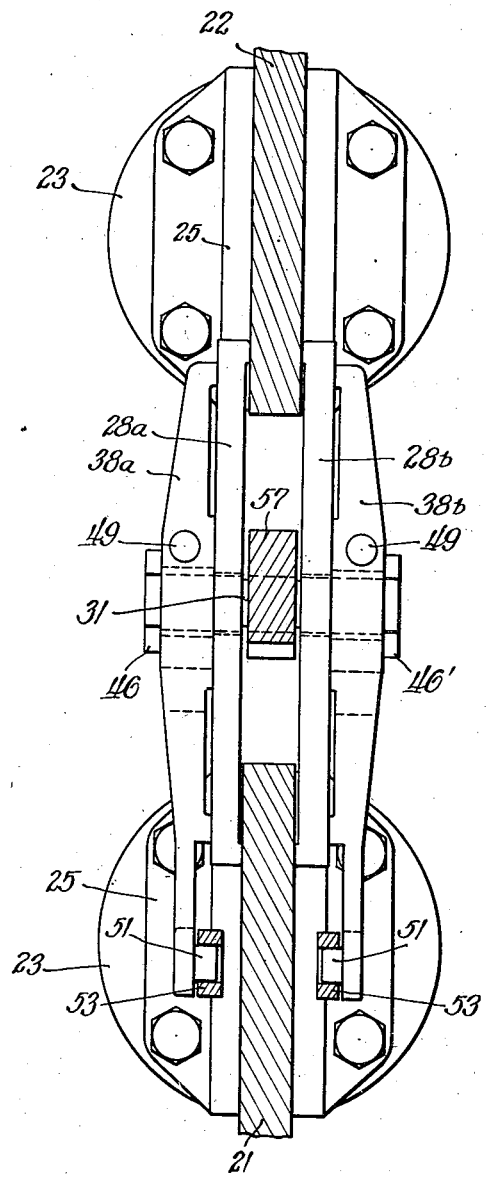
Figure 4 is a vertical sectional view taken approximately on the plane of the line 4—4 of Figure 1.
Figure 5:
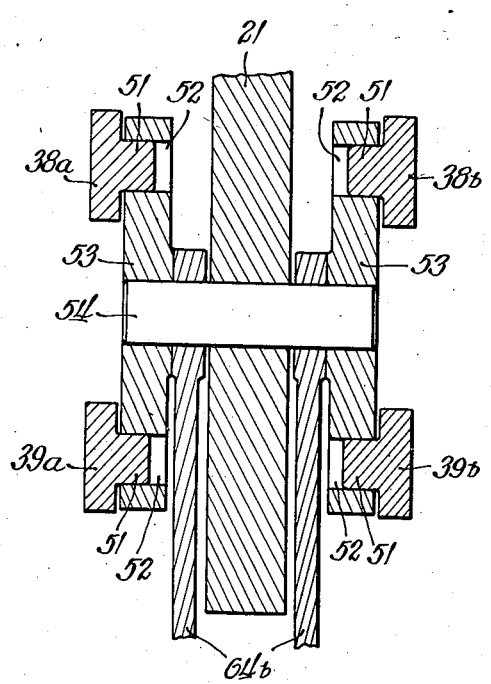
Figure 5 is a sectional view showing the rocker mounting of the blade elements and clamping members, taken approximately on the plane of the line 5—5 of Figure 1.

The blade assembly of the switch comprises four blade elements or bars arranged in two cooperating pairs 28a, 28b, and 29a, 29b (see Figures 4 and 5). As briefly mentioned heretofore, the opposite blade elements of each pair are in transversely spaced relation to receive the switch terminals 21, 22 between the blade elements. The pair of blade elements 28a—28b is adapted to be moved toward and from each other by the action of a right- and a left-hand threaded screw bolt 31, and, similarly the other pair of blade elements 29a—29b is adapted to be moved toward and from each other by the action of a similar screw bolt 32. Each pair of blade elements is arranged to shift endwise as a unit in order to secure the desired wiping action concurrently with the clamping pressure exerted by the screw bolts, one pair of blade elements shifting endwise in one direction while the other pair is shifting endwise in the opposite direction. This differential or opposite shifting relation is established by a parallel link relation between the blade elements, as will be presently described.

Referring to the detail construction of each blade element or section, as illustrated in Figures 6 and 7, it will be noted that each end is slotted longitudinally, as indicated at 34, to form pairs of parallel contact fingers, and the inner surface of each finger is formed with a raised contact area 35 adapted to have high pressure engagement with the adjacent surface of the corresponding switch terminal 21 or 22. Each blade section is also provided with a central circular opening 36 through which freely passes the screw bolt 31 or 32 which exerts the clamping pressure on the blade section.

Bearing against the outer sides of the blade sections are screw clamps 38a—38b and 39a—39b which coact with the screw bolts 31 and 32 to exert the clamping pressure. These clamp members are all duplicates, one being shown in detail in Figures 8 and 9, from which it will be seen that it is formed with an upper longitudinal slot 41 which separates the upper half into two finger portion, and is also formed with a lower longitudinal opening 42 which divides a part of the lower half into two side portions. These finger portions and side portions have raised pressure areas 43 which are machined off level with the raised central portion of the clamp, said pressure areas concentrating pressure on the slotted finger portions of each switch element 28a—28b, etc. A cylindrical opening 45 in each clamp member is adapted to receive a cylindrical nut 46 or 46', within which screws a threaded end of the associated screw bolts 31, 32. As shown in Figure 3, these bolts have righthand threads 31a—32a at one end, and lefthand threads 31b—32b at the other end. The nuts 46 are internally threaded for the righthand threads, and the nuts 46' are internally threaded for the lefthand threads. Each of these nuts is provided with a hexagonal outer head abutting against the outer surface of its corresponding clamping member 38a—39b, whereby a wrench can be readily applied to such hexagonal head for rotating the nut, such rotation enabling inward or outward adjustment of the corresponding clamping member to be effected, as for taking up wear, etc. Referring again to Figure 8, it will be observed that the slot 41 extends across the cylindrical opening 45 so that the sides of said opening can be squeezed together to lock the cylindrical nut 46 or 46' in any position of rotative adjustment that has been given to said nut in the opening 45. This locking function is accomplished by a cap screw 49 which extends freely through one finger portion of the clamp, on one side of the slot 41, and taps into a threaded bore in the finger portion on the other side of the slot.

Each clamping member has its lower portion converging down to a narrow pivot boss from which projects an inwardly extending pivot stud 51. This stud has pivotal mounting in a pivot opening 52 which is formed in each end of a rocker member 53. Referring to Figure 5, there are two of such rocker members, one disposed on one side of the hinge terminal 21 for pivotally mounting the lower ends of the clamping members 38a and 39a, and the other disposed on the opposite side of the hinge terminal for pivotally mounting the other clamping members 38b and 39b. Each rocker member has free rocker mounting at its center on a pivot pin 54 which extends transversely through the hinge terminal 21. No differential shifting force is imparted to the clamping members and blade sections through these rocker members 53, the actual transmission of shifting force to said parts being through the upper rocker lever 57, which I shall now describe.

This upper rocker lever 57 extends into the space between the pairs of opposing blade elements for establishing operative connection with the screw bolts 31, 32. As shown in Figure 3, the lever has square openings 58 and 59 extending therethrough for mounting the bolts 31 and 32, the latter having square central boss portions 31c and 32c which fit snugly within the square holes 58 and 59 for compelling concurrent angular movement between the rocker lever and screw bolts. Referring to Figure 1, it will be noted that this portion of the rocker lever which extends between the screw bolts occupies the same rocker function or relation with respect to these screw bolts that the lower rocker members 53 occupy with respect to the pivots 51; the lines between all four pivots centers defining a parallelogram. In consequence of this relation, whenever differential shifting motion is imparted to the clamping members and blade elements, the upper rocker lever 57 has rocker motion about a virtual pivot 54x (Figure 1), corresponding to the motion of the lower rocker members 53 about the center pivot 54. The outer arm 57a of the upper rocker lever 57 inclines slightly downwardly and is formed with a forked end which is apertured transversely for receiving the pivot pin 61. This pin establishes pivotal connection with the upper end of a toggle link 62 which extends into the forked end of the rocker lever 57. The lower end of said toggle link has pivotal connection through a pivot pin 63 with an operating lever 64. As shown in Figure 2, the upper portion of the lever 64 is of boxlike or channel section with the open side toward the switch parts, and the arm 57a and the toggle link 62 are disposed within the channel formation. The lower part of the operating lever is of forked formation, comprising spaced arm portions 64b which extend downwardly and inwardly under the switch parts and have pivotal mounting on the hinge pin 54. This lower forked portion 64b of the operating lever has no direct connection with the lower rockers 53, and could be mounted on a pivot center other than the hinge pin 54.

Referring again to the toggle link 62, as shown in Figure 10, this link comprises an upwardly extending stop arm 66 which is operable to engage a stop shoulder 67 which is formed as a cross web within the forked outer end of the rocker lever extension 57a. A torsion spring 68 is coiled about the pivot pin 63 and has one end hooked to the toggle link 62 and the other end hooked to the operating lever 64 in such relation as to tend to rotate the toggle link 62 in a counterclockwise direction about the pivot pin 63. Thus, the tendency of this spring is a continuous effort to straighten out the toggle mechanism, tending to bring the knuckle pivot 61 toward a position of dead-center alignment with the virtual pivot 54x at one extremity and the hinge pin 63 at the other extremity. As shown in Figure 10, the stops 66 and 67 come into abutment when the knuckle pivot 61 arrives in this dead center alignment, such position representing a locked condition of the toggle mechanism. This locked condition continues during the entire time the switch is open, and until the blade assembly is almost back in its final closed position, during the return motion of the operating lever 64. A toggle-breaking lug 69 projects from the outer extremity of the rocker lever extension 57a and is adapted to strike a toggle-breaking stop screw 70 for breaking the toggle joint just as the blade assembly gets back into approximately vertical position. The stop screw 70 is adjustably mounted in the hinge clip structure 21 for screwing inwardly or outwardly to angularly adjust the toggle breaking location.

The switch is held in its closed circuit position by a latch 71 which is released by the switch operator 72 when the latter is actuated to move the operating lever 64. In the embodiment illustrated, the operator 72 is in the form of an eye for receiving a pole hook, but it will be understood that the term operator is also intended to embrace an operating handle, an operating shaft, and other operating instrumentalities. For a three-phase gang switch, such as is illustrated in Figure 2, the eye clip 72 is bolted to the center of a long insulating bar 73 which extends across the upper ends of the three operating levers 64. Pivotally mounted on the upper end of each operating lever 64 is a latch tripping clevis 75 to which the insulating bar 73 is bolted. Said latch tripping clevis or member 75 is of inverted U-shaped form, comprising side arms 76 which extend down along the outer sides of the operating lever 64, and receive a pivot pin 77 which extends transversely through the operating lever. The inner end of the latch 71 is mounted for swinging movement on the pin 77, between the side flanges of the operating lever. The forward end of said latch is of yoke or forked formation, having duplicate portions adapted to lie to each side of the terminal clip 22, and to engage over a latch pin 79 which projects laterally from each side of the terminal clip. Releasing shoulders 81 project laterally from each side of the intermediate portion of the latch, and are adapted to be engaged by releasing shoulders 82 projecting inwardly from the latch tripping member 75. This operating relation enables the latch 71 to swing upwardly in the relatching operating without oscillating the bar 73 and operating eye 72. Limiting stop lugs 83 project laterally from the sides of the operating lever 64 and are engaged by stop shoulders 84 on the tripping member 75 for limiting the outward oscillatory movement of said member relatively to the operating lever.

In the operation of this embodiment, an outward pull exerted on the eye 72 through the pole hook first serves to oscillate the tripping member 75, and thus release the latch 71, thereby freeing the switch for opening movement. Continued outward and downward movement of the operating lever 64 around the pivot center 54 exerts a downward and outward pull on the toggle link 62. This pull is transmitted through the knuckle pivot 61 to the rocker lever 57, thereby establishing a rotative force in this lever tending to rotate it around the virtual pivot 54x. In consequence of this rotative movement, the blade elements 28a—28b are shifted upwardly, the blade elements 29a—29b are shifted downwardly, and, simultaneously therewith, an outward separating force is set up through the medium of the screw bolts 31 and 32, separating the blade elements of each of the aforesaid pairs, so that their clamping pressure on the switch terminals 21 and 22 is released. The action of the timing spring 68 is to retain the blade elements in their substantially vertical positions, until the toggle parts 57a and 62 have moved substantially into dead-center relation, i. e., until the stop shoulders 66 and 67 engage for stopping further toggle movement between the parts. Thereupon, continued outward and downward swinging movement of the operating lever 64 carries the blade assembly with it, swinging the blade elements down into the fully opened position illustrated in dotted lines in Figure 1. Any suitable stop means may be provided for interrupting further motion of the operating lever 64 or of the switch blades at this point. The pressure of the timing spring 68 keeps the toggle parts in the straightened relation illustrated so long as the switch is open. In the operation of closing the switch, the upward and inward movement transmitted through operating eye 72 swings the operating lever 64 and blade assembly upwardly as a unit. When the blade assembly nears the closed position, the toggle-breaking lug 69 strikes the stop screw 70 and breaks the toggle 57—61—62; and immediately following this the innermost blade elements encounter a stop which interrupts further rotative movement of the blade assembly. The latter stop may consist of the outer vertical shoulders 25' at the outer edges of the bracket structures 25 which support the terminal clips 22. When the blade elements 28a—28b strike against these shoulders, the continued upward and inward motion of the operating lever 64 imparts rotative motion to the rocker lever 57, causing it to oscillate about the virtual pivot 54x in a counterclockwise direction. Such motion of the rocker lever imparts downward shifting movement to blade elements 28a—28b, imparts upward shifting movement to blade elements 29a—29b, and, simultaneously therewith, exerts an inward contracting force through the medium of the screw bolts 31—32, thereby drawing the blade elements into firm clamping pressure with the terminal clips 21 and 22 at the same time that these blade elements are being given a sliding or wiping motion across the surfaces of said terminal clips. In the final range of movement of the operating eye 72, the latch 71 is nosed upwardly and then dropped behind the latch pin 79 for locking the switch in closed position. Attention is directed to the fact that by having the operating lever 64 pivotally mounted on a pivot axis 54 which is disposed adjacent to the bottom part of the blade assembly, the operating lever can be made relatively long for obtaining adequate leverage, without having the upper end of the lever project to an objectionable height above the upper end of the blade assembly. I preferably construct the blade elements 28a—29b as entities separate from the clamping members 38a—39b because this enables me to make the blade elements of maximum conductivity, and the clamping members of maximum pressure transmitting strength, but, in some situations, the blade elements and clamping members may be constructed as integral parts.

Figures 11 to 15, inclusive, show another embodiment of my invention in the form of a high amperage single pole indoor switch, although it will be understood that these same operating principles may also be embodied in other forms of switches. In order to obtain relatively large current carrying capacity in this embodiment, there are four sets of blade elements, arranged in side-by-side pairs as a single pole for engaging duplicate sets of switch terminals. The duplicate hinge terminals or clips 91—91' and the duplicate front terminals or clips 92—92' are shown as extending back through an insulating panel 93 for connection with the circuit on the back side of said panel, although it will be understood that any other insulated mounting of the terminals may be employed. The hinge clips 91—91' are secured in place by an intermediate channel-shaped bracket 94, and by two outer brackets 95—95'. The channel-shaped bracket has its web portion abutting against the insulating panel 93, and has its two side flanges abutting against the inner side surfaces of the hinge clips. The two side brackets 95—95' have their base flanges bolted to the insulating panel, and have their upstanding flanges secured to the hinge clips by rivets or bolts which also pass through the side flanges of the channel-shaped bracket 94. The duplicate front clips 92—92' are secured to the insulating panel 93 by the same arrangement of channel-shaped bracket 96 and two side brackets 97—97'.

Figure 13:
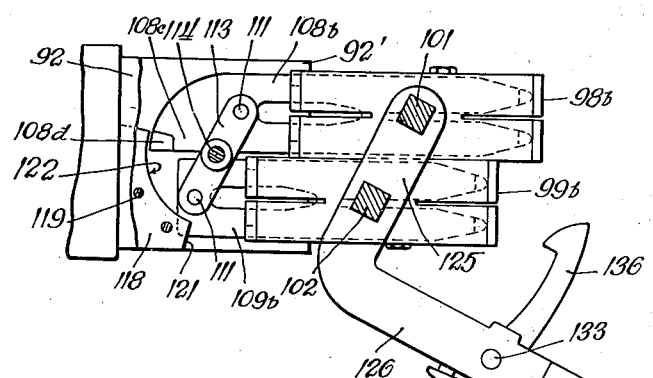
Figure 13 is a fragmentary view showing the final stage of opening the switch.
Figure 15:
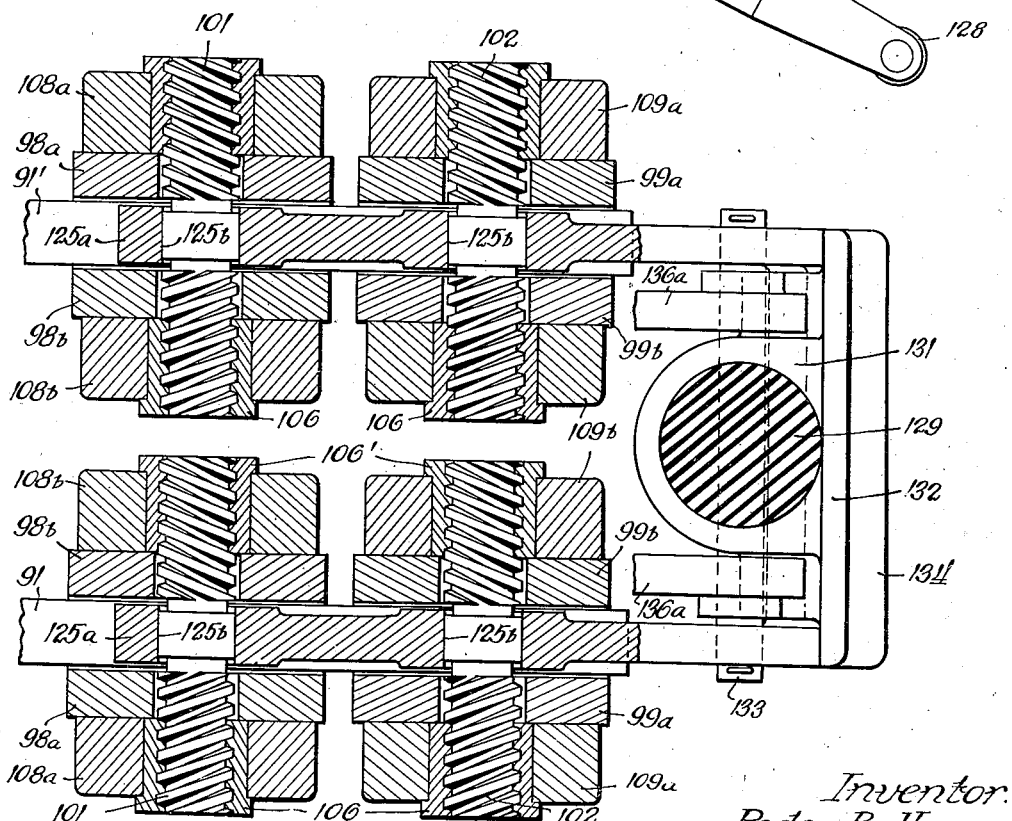
Figure 15 is a transverse sectional view through the operating lever and screw clamping mechanism, taken approximately on the plane of the line 15—15 of Figure 11.

The blade assembly for the terminal clips 91—92 comprises the four blade elements or bars arranged in two cooperating pairs 98a—98b and 99a—99b, this being substantially a duplicate of the arrangement described in the preceding embodiment. As shown in Figure 15, this same blade assembly 98a—98b and 99a—99b is duplicated for the other terminal clips 91'—92'. As shown in Figure 13, each blade element has each end slotted longitudinally to form pairs of parallel contact fingers, and the inner surface of each finger is formed with a raised contact area adapted to have high pressure engagement with the adjacent surface of the corresponding terminal clip, these blade elements thus being substantial duplicates of those described in the preceding embodiment. Passing through the central openings in the blade elements are the pairs of screw bolts 101 and 102, these having square central boss portions and oppositely threaded end portions (see Figure 15) in substantially the same arrangement as previously described. The opposite ends of these screw bolts have threaded engagement within adjustable nuts 106—106' which are mounted within the clamping members 108a—108b and 109a—109b. Each of these clamping members has a slot in its upper end and an opening in its lower portion to provide the finger portions and side portions which have raised pressure areas adapted to engage the finger portions of the blade elements, in substantially the same construction and arrangement described of the preceding embodiment. Projecting inwardly from the lower portion of each of these clamps is a pivot stud 111 which has pivotal mounting at the outer end of a rocker member 113 (Figure 13). In substantially the same manner as described of the preceding embodiment, one of these rocker members is disposed on the outer side of each hinge clip 91—91' for pivotally connecting the front and rear outside clamps 108a—109a, and a corresponding rocker member is mounted on the inner side of each hinge clip for pivotally connecting the front and rear inside clamps 108b—109b. Each inner and outer rocker is mounted on a pivot screw or pin 114 which extends through the hinge clip. These rocker members occupy substantially the same space between the lower portions of the clamps and the hinge clips as is occupied by the blade elements between the upper portions of the clamps and the clips, the raised areas on the inner surfaces of the clamps insuring that the clamping pressure is applied to the blade elements and not to the rocker members in the clamping operation. The four clamping members are of identical construction with the exception of the inner rear clamping member 108b which has an extension portion or arm 108c projecting downwardly and carrying a timing lug 108d at its lower end (Figures 12 and 13). This timing lug projects inwardly from the inner surface of the extension arm 108c, and is adapted to cooperate with a timing cam 118, there being one of these timing cams secured by rivets 119 to the inner side surface of each hinge terminal 91—91'. Each cam has an approximately vertical stop shoulder 121, from the upper edge of which continues an arcuate surface 122 which is approximately concentric with the axis of the rocker pivot 114. In this embodiment of my invention, the operating relation of the screw bolts and rocker members is such that when the blade elements are clamped against the terminal clips in the fully closed position of the switch, the front and rear pairs of blade elements are in substantially side-by-side relation, with their upper and lower edges at substantially the same height (Figure 11). This disposes the timing lugs 108d of the two inner rear clamps 108b at their lowermost positions, where they lie in abutment, or approximately so, against the stop shoulders 121 of the timing cams. Hence, it is impossible for the blade assembly to partake of an outward pivotal motion toward switch opening position at this time. However, after the differential shifting motion has been imparted to the blade assembly, causing the rear pair of blade elements and clamps to be shifted upwardly and the front pair of blade elements and clamps to be shifted downwardly, the timing lugs 108d are elevated out from against the stop shoulders 121, and are placed in position where they can swing along the arcuate surfaces 122 of the timing cams (Figure 12). The entire blade assembly can now be swung outwardly and downwardly around the pivotal center 114 for moving the switch to the open position illustrated in Figure 13. The timing lug 108d remains under the control of the arcuate surface 122 when the blade assembly is in the fully open position, and, hence, when closing movement is imparted to the blade assembly, the pairs of blade elements are compelled to remain in this differentially shifted position until the blade assembly is back in its upright, switch-closing position, whereupon the timing lug 108d can be thrust downwardly behind the stop shoulder 121. This upward swinging movement of the blade assembly into its closed position is limited by the rear pairs of blades striking the front edges of the side brackets 97—97', or any other equivalent stop means.

The rocker lever 125 which actuates the two screw bolts 101—102 is formed as a right-angle extension of the operating lever 126. As shown in Figure 15, the rocker member 125 is of yoke formation comprising the two parallel arm portions 125a—125a, each having a pair of square openings 125b therein for receiving the square hub portions of the screw bolts 101—102. The outer ends of these arms 125a continue upwardly and form the side flanges or walls of the channel-shaped operating lever 126, these side flanges being joined at the front by a transverse web 126a.

The switch operator is shown as being in the form of a handle 128, although it will be understood that it might be an eye for receiving a pole hook, or it might have connection with an operating shaft or other operating instrumentalities. In the construction disclosed, the lower socket portion 128' of this handle is secured fast to the upper end of a section of insulating material 129. The lower end of this insulating section or rod 129 is anchored in a socket formation 131 (Figure 15) formed integrally on the inner side of a latch tripping member 132. Said tripping member is rockably mounted in the upper end of the operating lever 126 on a pivot pin 133 which extends through the side flange portions of said lever, and through the socket 131 and insulating rod 129. A front plate portion 134 formed as a part of the latch tripping member 132 overlies the front edges of the operating lever side flanges, said plate being inclined outwardly and downwardly to function as a limiting stop for limiting the clockwise oscillatory motion of the latch tripping member, by striking the front edges of the operating lever. As shown in Figures 11 and 15, the latch 136 is of yoke or H-shaped construction, comprising the side arm portions 136a which are joined together by the transverse web portion 136b. As shown in Figure 15, the front ends of the side arm portions have pivotal mounting on the pivot pin 133 between the socket formation 131 and the side flange portions of the operating lever. The hook formations at the inner or rear ends of the latch structures are adapted to engage over a latch pin or pins 138 mounted in the front clips 92—92'. Lugs 139 projecting inwardly from the lower part of the plate portion 134 are adapted to engage cooperating lugs 136c extending down from the side arm portions of the latch structure. The engagement of these lugs effects the tripping of the latch to its released position when the operating handle 128 is rocked in a clockwise direction about the pivot pin 133. In the operation of restoring the switch to closed position, the latch can rise and drop down over the latch pins 138 without oscillating the operating handle relatively to the operating lever. If desired, stop shoulders 140 may project inwardly from each side flange portion of the operating lever in position to strike the outer vertical edges of the terminal clips 92—92', for establishing a limiting stop which limits the motion of the operating lever relatively to the blade assembly and to the terminal clips at the end of the switch closing operation. The screw threaded motion of the blade elements, and the sliding motion thereof, during each operation of opening the switch and closing the switch, will be obvious from the description of the preceding embodiment. It will be understood that the rocker lever 125 has rocker motion about a virtual pivot 114x, such pivot being established by the lower rocker pivot 114.

Referring now to the embodiment illustrated in Figures 16 and 17, this construction employs a positively operating toggle which performs the two-fold function of (1) timing the three motions of the blade assembly, and (2) positively locking or latching the blade assembly in its switch closing position. Also, in this construction, the switch operating means preferably has link connection with the knuckle pivot of the toggle, although this operating means may be otherwise connected with the blade assembly. For the purpose of illustration, a high amperage single pole indoor switch is shown, although it will be understood that this same toggle principle may also be embodied in other forms of switches. In order to obtain large current carrying capacity, there are provided duplicate hinge terminals 141—141' and duplicate front terminals 142—142', adapted to be engaged by four sets of blade elements, arranged in side-by-side pairs, substantially as illustrated in the preceding embodiment. The hinge clips are shown as being the side portions of a U-shaped bracket which is secured by bolts or cap screws 144 to the insulating block 145. The front or upper clips 142—142' likewise constitute the side portions of a U-shaped bracket which is secured by bolts or cap screws 146 to the insulating block 145. The upper and lower extremities of these terminal brackets are slotted as shown in Figure 16 for effecting bolted attachment to a plurality of bus conductors. The insulating block 145 is secured to the outer face of a mounting bracket 147 which is bolted to the back surface on which the switch is mounted.

The blade assembly comprises the cooperating pairs of blade elements 148a—148b and 149a—149b, one of these sets of four blade elements being provided for each of the two pairs of clip elements 141—142 and 141'—142'. These blade elements are of substantially the same construction as described in the case of the preceding embodiments, the blade elements being moved transversely toward and away from each other and being shifted endwise in opposite directions through the actuation of the screw bolts 151 and 152. These bolts have threaded engagement within the adjustable nuts 153—153', which are capable of being rotated for adjustment in the same manner previously described of the nuts 46—46'. The nuts are mounted in the clamping members 158a—158b and 159a—159b, these clamping members being practically of the same construction as those previously described. The lower end of each clamping member is pivotally connected at 161 with the outer end of a rocker member 163 which has central pivotal mounting on a pivot pin 164 passing through each hinge clip section, such rocker mounting being the same as previously described.

The rocker lever 165 which actuates the screw bolts 151—152 of each set of blade elements comprises the two parallel arm portions 165a—165a which extend inwardly between the pairs of blade elements (Figure 17), and are formed with the square openings for receiving the square hub portions of the screw bolts. The front ends of these parallel arm portions are cross connected by a cross bar portion 165b, resulting in a U-shaped formation in this part of the member 165. Extending downwardly from the center of the cross bar 165b is an arm or link portion 165c which has a bifurcated lower end 165d (Figure 17). This bifurcated lower end has pivotal connection through a knuckle pivot 166 with a toggle link 167. As shown in Figure 17, the toggle link is of bifurcated construction, comprising spaced side arm portions extending upwardly from a main hub portion 167a. This hub portion is mounted on a stationary pivot pin 168 which is mounted in bracket arms 169 projecting outwardly from the hinge clip 141—141'.

Pivotally mounted on the knuckle pin 166 between the fork arms 165d is the front end of a push-pull operating link 171, composed of any suitable insulating material. The rear end of this link is pivotally connected at 172 to an operating crank 173 secured to the transversely extending operating shaft 174. Oscillation of this shaft is operative to pull and push the link 171 for opening and closing the switch through the toggle mechanism 165—166—167, which toggle mechanism operates in the three-fold capacity of operating means, timing means, and locking means.

It will be seen that when the switch is in the closed position illustrated in full lines in Figure 16, the knuckle pivot 166 occupies a position beyond or outward of the dead-center line $x$—$y$ drawn through the center of the virtual pivot 164$x$ and the center of the lower stationary pivot 168. Thus, the toggle mechanism is in an over-center locked position for positively holding the blade assembly against accidental opening. When the operating crank and link are oscillated rearwardly to open the switch, the knuckle pivot 166 is pulled back through the dead-center line and the two toggle members 165 and 167 are subjected to a relative folding motion, which finally brings these members into the dotted line positions illustrated in Figure 16. It will be noted that in this dotted line position the toggle pivot 166 is substantially the same distance from the hinge pivot 164 that it was in the full-line position. The downward and inward motion of the member 165 rotates the screw bolts 151—152 and simultaneously shifts the pairs of blade elements differentially. The continued folding motion of the toggle then swings the blade assembly outwardly and downwardly into the open switch position illustrated in dotted lines. In such motion, the pair of blade elements are first shifted differentially in opposite directions, and are then shifted back approximately to the original relation, with the outer edges of all of the blade elements substantially even, when the blade assembly reaches the open position. This may cause the blade elements to exert some clamping pressure on the hinge clip structure when the blade assembly is in the open position, but such is not of any objectionable amount because the absence of any clip structure between the outer ends of the blade elements prevents their inner ends being forced together with any great pressure. In the reverse operation of closing the switch, the outward thrusting force exerted on the knuckle pivot 166 operates to straighten the toggle parts back into their original positions, this motion of the member 165 causing the pairs of blade elements to again go through their transverse movements and endwise shifting movements for bringing the blade elements back into clamping engagement with the terminal clips.

An alternative adaptation which retains the toggle mechanism 165—166—167, but which dispenses with the back connected mechanism 171—174, may be obtained by extending an operating handle or an operating eye upwardly from the cross bar portion 165b of the member 165, substantially the same as the operating handle or operating eye of the preceding embodiments. In such arrangement, the toggle mechanism 165—166—167 would time the motions of the blade assembly, and could also be employed to lock the switch in the closed position.

Figures 18 and 19 illustrate another construction in which toggle mechanism quite similar to that shown in Figures 16 and 17 is embodied in a high voltage switch particularly adapted for outdoor installations. In this construction, the hinge terminal structure 181—181' and the front or upper terminal structure 182—182' are mounted on high voltage insulators 183 and 184. These terminal clips are shown as being connected through coupling connectors 185 and 186 with tubular conductors, although it will be understood that coupling connection may be established with other forms of conductors.

The blade assembly is generally similar to that previously described, comprising the cooperating pairs of blade elements 188a—188b and 189a—189b. These blade elements have slotted upper ends and apertured lower portions, as previously described, and carry pivot studs 191 at their lower extremities which have pivotal mounting in the outer ends of rocker members 193 which are pivotally supported at 194 on the clip structure 181—181'. Bearing against the outer sides of the blade elements are the clamping members 195a—195b and 196a—196b.

The blade elements and clamping members are similar in construction to those previously described, but because of the high voltage characteristic of the switch they are made relatively long in this embodiment to effect a large opening. Because of this greater length of the blade assembly parts, I prefer to employ two pairs of screw bolts 197—198 and 199—200 for each set of blade elements. Both pairs of screw bolts have threaded engagement within adjustable nuts carried by the clamping members, this construction and arrangement being the same as previously described. The two lower screw bolts 197—198 are actuated by a rocker lever 205 which is very similar to the previously described rocker lever 165, comprising the parallel arm portions extending inwardly between the pairs of blade elements, the cross bar portion 205b, and the downwardly extending arm or link portion 205c. The rocker motion of this lever 205 with respect to the screw bolts 197—198 occurs about a virtual pivot 194' which is located centrally between the screw bolts, corresponding to the central location of the lower rocker pivot 194. The two upper screw bolts 199—200 are coupled together by a transverse rocker member or link 201. This rocker link has square openings in its ends for engaging over the square bosses of the screw bolts, and the rocker motion of this tie link member occurs about a virtual pivot 194", which occupies the same relation with respect to the screw bolts 199—200 that the virtual pivot 194' occupies with respect to the lower screw bolts 197—198. Thus, the three rocker members 193, 201, and 205 all rock as a unit in the differential shifting movement of the pairs of blade elements. This concurrent rocking movement of the members 201 and 205 causes the lower pair of screw bolts 197—198 and the upper pair of screw bolts 199—200 to have the same degree of angular motion for causing the same amount of transverse movement between the blade elements at the lower end of the blade assembly and at the upper end of the blade assembly.

The lower end of arm 205c of rocker lever 205 has a knuckle pivot connection 206 with a toggle member 207, this relation being similar to the toggle mechanism 165—166—167 of Figures 16 and 17. The toggle member 207 is pivotally mounted on a stationary pivot pin 208 which is mounted in bracket arms 209 projecting outwardly from the hinge clip structure 181—181'. In this embodiment, the toggle member 207 constitutes one arm of a bell crank or double lever unit comprising another arm 211. This other arm has a bifurcated outer end, and pivotally mounted therein on the transverse pivot pin 212 is a universal joint coupling 213. Extending through said universal joint member at right angles to the pin 212 is another pin 214, which mounts the universal joint in the forked upper end of a push-pull operating link 216. The lower end of said link has an apertured portion 217 which engages over a crank pin 218 projecting from a crank arm 219. The front and back surfaces of the apertured link portion 217 are formed with rounded lobe surfaces adapted to bear against the crank arm 219 and against the nut 221 engaging over the outer end of the crank pin, these rounded lobes accommodating inward and outward rocking movement of the link 216 relatively to the crank arm and crank pin. This apertured link portion 217 may have threaded mounting within the lower end of the link 216 so as to provide an adjustment enabling the effective length of the link to be varied.

The hub of the crank arm 219 is secured fast to an operating shaft which is journaled for oscillation in a bearing bracket 224 bolted between the lower portions of the clip bars 181—181'. The inner end of this shaft is secured fast to a rotatable insulator 225 which has an inner shank portion 226 mounted for rotation in a stationary bearing bracket 227. A crank arm 228 extends from the shank 226 and is adapted to have operative connection with any suitable actuating linkage arranged to actuate the switch.

The operation of this embodiment is very similar to that illustrated in Figures 16 and 17. When the switch is in the closed position illustrated, the knuckle pivot 206 occupies a position beyond or outward of the dead-center line $x$—$y$ drawn through the center of the virtual pivot 194' and the center of the lower stationary pivot 208. Thus, the toggle mechanism is in an over-center locked position for positively holding the blade assembly against accidental opening. When the rotatable insulator 225 is rotated in a clockwise direction (Figure 19), the crank 219 exerts an upward thrust on the link 216, which, in turn, imparts rotative movement to the lever arms 211 and 207 in a counterclockwise direction, thereby folding the toggle mechanism 205—206—207 in an inward direction, causing the knuckle pivot 206 to swing inwardly over the dead-center line $x$—$y$. This breaks the toggle, and concurrently therewith imparts a rocking motion to the rocker lever 205 for causing differential shifting movement to be imparted to the blade elements through the screw bolts 197—198. The relative rotation of both pairs of screw bolts 197—198 and 199—200 concurrently with the differential shifting motion of the blade elements releases the blade assembly from its clamped engagement against the outer surfaces of the switch terminals. The continued folding motion of the toggle then swings the blade assembly outwardly and downwardly into the open switch position. In the reverse operation of closing the switch, the reverse rotation of the rotatable insulator 225 exerts a downward pull on the link 216, which operates through the lever 211 to straighten the toggle parts back into their original positions, this motion of the rocker lever 205 causing the pairs of blade elements to again go through their transverse movements and endwise shifting movements for bringing the blade elements back into engagement with the side surfaces of the switch terminals.

The two toggle operated embodiments shown in Figures 16–17 and 18–19 may, if desired, be provided with additional locking means to supplement the locking action of the toggle mechanisms, as, for example, in situations where excessive vibration might shake the toggle mechanisms loose. In the case of Figures 16–17 this could be any latch or lock for positively locking the shaft 174 against switch opening rotation; and in the case of Figures 18–19 it could be any latch or lock for positively locking the operating crank arm 228 against rotation.

In all of the embodiments herein disclosed, I preferably have the range of endwise shifting motion of the blade elements exceed the area of the raised contact surfaces on the blade elements, or the equivalent thereof. For example, a contact area which is approximately ¼ inch long in the direction of shift is shifted through a distance of approximtely ⅜ inch or longer. Should a relatively long contact area be desired, this may be divided into sections by a series of grooves, these grooves assisting to clean the surfaces. Such grooved or ribbed contact areas are typically represented in prior Patents Nos. 2,208,411 and 2,217,433.

While I have illustrated and described what I regard to be the preferred embodiments of my invention, nevertheless it will be understood that such are merely exemplary and that numerous modifications and rearrangements may be made therein without departing from the essence of the invention.

I claim:

1. In an electric switch, the combination of a pair of spaced terminals, a blade structure mounted for opening and closing movements relatively to said terminals, said blade structure comprising a plurality of relatively movable blade elements, and operating mechanism operative to open and close the switch, said operating mechanism including means for causing relative endwise motion between said blade elements, and including relatively rotatable members having interwedging surfaces for causing relative transverse motion between said blade elements, both in timed relation to the opening and closing movements of said blade structure.

2. In an electric switch, the combination of a pair of spaced terminals, a blade assembly mounted for swinging movement between open and closed positions relatively to said terminals, said blade assembly comprising a plurality of relatively movable blade elements, and operating mechanism operative to open and close the switch, said operating mechanism including means for causing differential sliding motion of said blade elements relatively to said terminals and including screw-threaded means for causing relative transverse motion between said blade elements relatively to said terminals, both in predetermined relation to the opening and closing movements of said blade assembly.

3. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism comprising rocker means for causing differential endwise motion between said blade elements, and also comprising screw-threaded means for causing relative transverse motion between said blade elements.

4. In an electric switch, the combination of a pair of spaced switch terminals, a blade assembly mounted for opening and closing movements relatively to said terminals, said blade assembly comprising a plurality of relatively movable blade elements, and operating mechanism operative to open and close the switch, said operating mechanism comprising means for imparting shifting motion to one of said blade elements for causing the latter to engage one of said switch terminals with a wiping contact action, and rotary means for causing blade elements of said blade assembly to be drawn toward each other in order to establish contact with one of said switch terminals with a high pressure clamping engagement.

5. In an electric switch, a pair of spaced terminals, a switch member comprising a pair of oppositely disposed parallel bars for bridging said terminals, said bars adapted to be drawn toward each other to have clamping engagement against the outer sides of said terminals, and operating mechanism for moving said switch member between open and closed positions, said mechanism being operative to move the ends of said bars from a position away from said terminals to a position in proximity to said terminals and including means for thereafter moving said bars longitudinally and transversely toward one another to force said bars into pressure engagement with said terminals with a wiping contact action.

6. In a switch, the combination of switch terminals, a blade assembly comprising relatively movable conducting blade elements, and actuating mechanism operative to open and close the switch, said mechanism functioning upon the closing of the switch to cause relative shifting motion between blade elements of the blade assembly, and including interengaging members having interwedging surfaces for drawing the blade elements of the blade assembly toward each other.

7. In a switch, the combination of a terminal member, a conducting blade member having pivotal swinging movement into and out of engagement with said terminal member, and operating mechanism for opening and closing the switch, said operating mechanism comprising means operative after the blade member has completed its pivotal swinging movement into switch closing position for causing relative wiping engagement between said members, and including screw means for effecting high pressure contact between said members in switch closing position.

8. In a switch, the combination of a relatively stationary contact, a movable blade unit adapted to engage said contact, operating mechanism operative to open and close the switch, screw means responsive to said operating mechanism for securing clamping action between said blade unit and said stationary contact, and means responsive to said operating mechanism for causing relative sliding motion between said blade unit and said contact during the operation of said screw means.

9. In an electric switch, the combination of a pair of spaced terminals, a blade structure mounted for opening and closing movements relatively to said terminals, said blade structure comprising a first pair of coacting blade elements and a second pair of coacting blade elements, a first screw bolt arranged to cause relative transverse movement between said first pair of blade elements, a second screw bolt arranged to cause relative transverse movement between said second pair of blade elements, rocker means for actuating said screw bolts, and operating mechanism operative to open and close the switch and to actuate said rocker means.

10. In an electric switch, the combination of a pair of spaced terminals, a blade structure mounted for opening and closing movements relatively to said terminals, said blade structure comprising two pairs of cooperating blade elements disposed in side-by-side relation, separate screw bolts operatively connected with said pairs of blade elements for causing relative transverse movement between the blade elements of each pair, rocker means operatively connected with said screw bolts to rotate the latter and to impart opposite shifting movements to said pairs of blade elements, and operating mechanism operative to open and close the switch and to actuate said rocker means.

11. In an electric switch, the combination of a pair of spaced terminals, a blade assembly mounted for opening and closing movements relatively to said terminals, said blade assembly comprising a first pair of coacting blade elements, a second pair of coacting blade elements spaced laterally therefrom, the blade elements of each pair being capable of relatively transverse movement toward and from each other, separate screw bolts for each pair of blade elements, said screw bolts being mounted on laterally spaced axes and each bolt having oppositely threaded ends coacting with the blade elements of its pair for causing the aforesaid relative transverse movements of said blade elements, and rocker means connected with said screw bolts and having rocker mounting on a pivot axis intermediate the axes of said screw bolts, whereby actuation of said rocker means rotates said screw bolts and simultaneously therewith imparts shifting movement to said first pair of blade elements in one direction and imparts shifting movement to said second pair of blade elements in the opposite direction.

12. In an electric switch, the combination of a pair of spaced switch terminals, a blade assembly having hinged mounting on one of said terminals for movement into and out of engagement with the other of said terminals, said blade assembly comprising a first pair of coacting blade elements, a second pair of coacting blade elements spaced laterally therefrom, the blade elements of each pair being capable of relative transverse movement for causing their inner surfaces to move into and out of clamping engagement with one of said switch terminals, clamping members operative to exert clamping pressure against the outer surfaces of said blade elements, nuts carried by said clamping members, first and second screw bolts for said first and second pairs of blade elements, said screw bolts being mounted on laterally spaced axes, each bolt having oppositely threaded ends engaging in said nuts and operative to cause the aforesaid relative transverse movement between the blade elements of its respective pair, rocker members pivotally connected with the laterally adjacent clamping members of opposite pairs of blade elements, rocker pivots for said rocker members disposed intermediate the pivotal connections of said rocker members with said clamping members, a separate rocker member carrying said screw bolts and having rocker movement about a virtual pivot intermediate the axes of said screw bolts, and operating means for actuating said latter rocker member so as to rotate said screw bolts and simultaneously therewith impart shifting movement to said first pair of blade elements in one direction and impart shifting movement to said second pair of blade elements in the opposite direction.

13. In an electric switch of the class described, the combination of a hinge terminal and a front terminal, a blade assembly hingedly mounted on said hinge terminal for swinging movement into and out of engagement with said front terminals, said blade assembly comprising front and rear pairs of cooperating blade elements disposed in side-by-side relation, said blade elements having their ends longitudinally slotted to form finger portions, raised contact surfaces of relatively small area projecting inwardly from the inner surfaces of said finger portions for engagement with the outer side surfaces of said switch terminals, front and rear pairs of clamping members disposed adjacent the outer surfaces of said blade elements, raised pressure areas projecting from said clamping members for exerting pressure on concentrated areas of said blade elements, oppositely threaded nuts carried by the clamping members associated with each pair of blade elements, a front screw-bolt extending through said front pair of blade elements and having oppositely threaded ends screwing into the oppositely threaded nuts carried by the front pair of clamping members, a rear screw-bolt extending through said rear pair of blade elements and having oppositely threaded ends screwing into the oppositely threaded nuts carried by the rear pair of clamping member, each of said nuts being mounted for rotative adjustment within its respective clamping member for adjusting the clamping action of said member, locking screws carried by said clamping members for locking said nuts in their adjusted positions, rocker members disposed on opposite sides of said hinge terminal and pivotally supported intermediate their ends on a hinge pin carried by said hinge terminal, the front ends of said rocker members being pivotally connected with the front pair of clamping members and the rear ends of said rocker members being pivotally connected with the rear pair of clamping members, a rocker lever extending between the opposing surfaces of both pairs of blade elements, said rocker lever having polygonal holes therein engaging over polygonal bosses formed on the central portions of said screw-bolts, and operating mechanism operatively connected to actuate said rocker lever.

14. In an electric switch, a pair of spaced terminals, a switch member comprising a pair of oppositely disposed parallel bars for bridging said terminals, said bars adapted to be drawn towards each other to have clamping engagement against the outer sides of one of said terminals, toggle means, and mechanism actuated through said toggle means for moving said switch member to move the ends of said bars from a position away from said terminals to a position in proximity to said terminals, and for thereafter moving said bars longitudinally and transversely towards one another to force said bars into said clamping engagement against the outer sides of one of said terminals with a wiping contact action.

15. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism including apparatus for causing relative shifting motion between said blade elements in a direction extending longitudinally thereof, and converging and separating motion between said blade elements in a direction extending transversely thereof, and a latch for locking the switch in closed position.

16. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism including apparatus for causing relative shifting motion and relative transverse motion between said blade elements, and toggle means operatively connected to transmit motion to said apparatus.

17. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism comprising a rocker member operative to cause relative endwise shifting motion between said blade elements, screw-threaded means actuated by said rocker member and operative to cause relative transverse motion between said blade elements, and toggle means connected to transmit operating motion to said rocker member.

18. In an electric switch, the combination of a pair of spaced terminals, a blade structure mounted for opening and closing movements relatively to said terminals, said blade structure comprising a plurality of relatively movable blade elements, operating mechanism operative to open and close the switch and including means for causing relative sliding motion between said blade elements longitudinally thereof, and relative converging and separating motion between said blade elements angularly thereof, and toggle means for timing said latter motions relatively to the opening and closing movements of the blade structure.

19. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism comprising rocker means for causing differential endwise motion between said blade elements, screw-threaded means actuated by said rocker means for causing relative transverse motion between said blade elements, an operating lever, and toggle means connecting said operating lever with said rocker means.

20. In an electric switch, the combination of a pair of spaced terminals, a blade assembly mounted for opening and closing movements relatively to said terminals, said blade assembly comprising a plurality of relatively movable blade elements, operating mechanism operative to open and close the switch, said operating mechanism comprising rocker means for causing differential endwise motion between said blade elements, screw-threaded means for causing relative transverse motion between said blade elements, and toggle means for timing said latter motions relatively to the opening and closing movements of the blade assembly, spring means tending to move said toggle means into an over-center locking relation when said blade assembly is moved to open position, and stop means for breaking said over-center locking relation when said blade assembly is moved back toward closed position.

21. In an electric switch, the combination of a pair of spaced terminals, a blade structure mounted for opening and closing movements relatively to said terminals, said blade structure comprising a plurality of relatively movable blade elements, operating mechanism operative to open and close the switch and including means for causing relative sliding motion between said blade elements in one direction and relative transverse motion between said blade elements in another direction, and cam means for timing said latter motions relatively to the opening and closing movements of the blade structure.

22. In an electric switch, the combination of a pair of spaced terminals, a blade assembly mounted for opening and closing movements relatively to said terminals, said blade assembly comprising a plurality of relatively movable blade elements, operating mechanism operative to open and close the switch, said operating mechanism comprising a rocker member for causing differential endwise motion between said blade elements, an operating lever extending from said rocker member, screw-threaded means actuated by said rocker member for causing relative transverse motion between said blade elements, timing lugs moving with said blade elements, and cam means cooperating with said timing lugs for controlling the differential endwise motion between said blade elements and timing both of said relative motions with respect to the opening and closing movements of the blade assembly.

23. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism comprising apparatus for causing relative shifting motion between said blade elements in one plane and relative transverse motion between said blade elements in another plane, toggle means connected to transmit motion to said apparatus, said toggle means comprising a knuckle pivot, and a push-pull link connected with said knuckle pivot to actuate said toggle means.

24. In a high voltage disconnect switch, the combination of a hinge terminal, a front terminal, separate high voltage insulators on which said terminals are mounted, a blade assembly having hinged mounting on said hinge terminal and movable into and out of engagement with said front terminal, said blade assembly comprising first and second pairs of cooperating blade elements disposed in side-by-side relation, the blade elements of each pair being capable of relative transverse movement for causing their inner surfaces to move into and out of clamping engagement with said terminals, upper and lower pairs of screw bolts coacting with said elements for causing the aforesaid relative transverse movements of said blade elements, upper and lower rocker members carrying said upper and lower pairs of screw bolts and having rocker mounting on axes intermediate the axes of their respective screw bolts, toggle means for imparting operating movement to one of said rocker members, and a third insulator mounted for rotative movement and operatively connected to actuate said toggle means.

25. In an electric switch, the combination of a pair of spaced terminals, a blade assembly mounted for opening and closing movements relatively to said terminals, said blade assembly comprising a plurality of relatively movable blade elements, and operating mechanism operative to open and close the switch, said operating mechanism comprising rocker means for causing differential endwise motion between said blade elements, and also comprising rotary means carried by said blade elements for causing relative transverse motion between said blade elements, said rotary means having rotary motion about an axis extending substantially transversely of said blade elements.

26. In an electric switch, the combination of a pair of spaced switch terminals, a blade assembly mounted for opening and closing movements relatively to said terminals, said blade assembly comprising a plurailty of relatively movable blade elements, and operating mechanism operative to open and close the switch, said operating mechanism comprising means for imparting shifting motion to one of said blade elements for causing the latter to engage one of said switch terminals with a wiping contact action, and rotary means for causing relative motion between said blade elements in a plane extending substantially transversely of said blade elements, said rotary means rotating about an axis extending substantially parallel to said transverse plane.

27. In an electric switch, the combination of a pair of spaced terminals, a blade assembly mounted for opening and closing movements relatively to said terminals, said blade assembly comprising a plurality of relatively movable blade elements, and operating mechanism for swinging said blade assembly through a plane between open and closed positions, said operating mechanism comprising shifting means for causing relative shifting motion between said blade elements, and clamping means for causing relative clamping motion between said blade elements, said clamping means rotating about an axis extending substantially at right angles to said plane of swinging motion of the blade assembly.

28. In an electric switch, the combination of a pair of spaced terminals, a blade assembly mounted for opening and closing movements relatively to said terminals, said blade assembly comprising a plurality of relatively movable blade elements, operating mechanism operative to open and close the switch, said operating mechanism comprising means for causing relative longitudinal motion and relative transverse motion between said blade elements, and toggle means for timing said latter motions relatively to the opening and closing movements of the blade assembly.

29. In an electric switch, the combination of a pair of spaced terminals, a blade assembly mounted for opening and closing movements relatively to said terminals, said blade assembly comprising a plurality of relatively movable blade elements, operating mechanism operative to open and close the switch, said operating mechanism comprising means for causing relative longitudinal motion and comprising relatively rotatable members having interwedging surfaces for causing relative transverse motion between said blade elements, and linkage means for timing said latter motions relatively to the opening and closing movements of the blade assembly.

30. In an electric switch, the combination of a pair of spaced terminals, a blade assembly mounted for opening and closing movements relatively to said terminals, said blade assembly comprising a plurality of relatively movable blade elements, operating mechanism for swinging said blade assembly through a plane between open and closed positions, said operating mechanism comprising shifting means for causing relative shifting motion between said blade elements, clamping means for causing relative clamping motion between said blade elements, said clamping means rotating about an axis extending substantially at right angles to said plane of swinging motion of the blade assembly, and linkage means for timing said latter motions relatively to the opening and closing movements of the blade assembly.

31. In an electric switch, the combination of a pair of spaced terminals, a blade structure having hinged mounting adjacent one end for opening and closing movements relatively to said terminals, said blade structure comprising a plurality of relatively movable blade elements, operating mechanism operative to open and close the switch, said operating mechanism comprising shifting means for causing relative longitudinal motion between said blade elements, clamping means for causing relative transverse motion between said blade elements, and cam means coacting with the hinged end of said blade structure for timing said latter motions relatively to the opening and closing movements of the blade structure.

32. In an electric switch, the combination of a pair of spaced terminals, a blade assembly mounted for opening and closing movements relatively to said terminals, said blade assembly comprising front and rear pairs of cooperating blade elements disposed substantially in side-by-side relation, and operating mechanism operative to open and close the switch, said operating mechanism comprising means for causing differential endwise motion between said front and rear pairs of blade elements, and means for causing relative transverse motion between the blade elements of each pair.

33. In an electric switch, the combination of a pair of spaced terminals, a blade assembly mounted for opening and closing movements relatively to said terminals, said blade assembly comprising a first pair of blade elements in face-to-face relation and a second pair of blade elements in face-to-face relation, and operating mechanism operative to open and close the switch, said operating mechanism including means for shifting one of said pairs of blade elements in one direction and the other of said pairs of blade elements in the opposite direction.

34. In an electric switch, the combination of a pair of spaced terminals, a blade structure mounted for opening and closing movements relatively to said terminals, said blade structure comprising a plurality of relatively movable blade elements, operating mechanism operative to open and close the switch, said operating mechanism comprising shifting means for causing relative longitudinal motion between said blade elements, relatively rotatable members having interwedging surfaces for causing relative transverse motion between said blade elements, and cam means for timing said latter motions relatively to the opening and closing movements of the blade structure.

35. In an electric switch, the combination of a pair of spaced terminals, a blade assembly mounted for opening and closing movements relatively to said terminals, said blade assembly comprising a first pair of blade elements in face-to-face relation and a second pair of blade elements in face-to-face relation, and operating mechanism operative to open and close the switch, said operating mechanism including means for shifting one of said pairs of blade elements in one direction and the other of said pairs of blade elements in the opposite direction, and relatively rotatable members having interwedging surfaces for causing relative transverse motion between the blade elements of each pair.

36. In an electric switch, the combination of a pair of spaced terminals, a blade structure mounted for opening and closing movements relatively to said terminals, said blade structure comprising blade elements and relatively movable clamping members for exerting clamping pressure against said blade elements, and operating mechanism operative to open and close the switch, said operating mechanism comprising means for causing relative endwise motion between said clamping members, and also comprising relatively rotatable members having interwedging surfaces for causing relative transverse motion between said clamping members.

37. In an electric switch, the combination of a pair of spaced terminals, a blade structure mounted for opening and closing movements relatively to said terminals, said blade structure comprising blade means and relatively movable clamping members for causing a clamping pressure to be exerted between said blade means and said terminals, and operating mechanism operative to open and close the switch comprising means for causing relative endwise motion between said clamping members, and means for causing relative transverse motion between said clamping members.

38. In an electric switch, the combination of a pair of spaced terminals, a blade assembly mounted for opening and closing movements relatively to said terminals, said blade assembly comprising a first pair of coacting blade elements, a second pair of coacting blade elements spaced laterally therefrom, the blade elements of each pair being capable of relative transverse movement toward and from each other, separate screw bolts for each pair of blade elements, said screw bolts being mounted on laterally spaced axes and each bolt having oppositely threaded ends coacting with the blade elements of its pair for causing the aforesaid relative transverse movements of said blade elements, and operating mechanism operative to open and close the switch, including means for causing substantially simultaneous actuation of both of said screw bolts.

39. In an electric switch, the combination of a pair of spaced terminals, a blade structure mounted for opening and closing movements relatively to said terminals, said blade structure comprising a pair of coacting blade elements, a screw bolt extending between said blade elements, separate threads of opposite lead formed on the opposite ends of said screw bolt, a pair of threaded sockets carried by said blade elements for receiving the threads on the opposite ends of said screw bolt, and operating mechanism operative to swing said blade assembly into switch closing position with a positively acting closing force, and including means for rotating said screw bolt relatively to said blade elements for exerting clamping force against said blade elements.

PEDER B. HOYE.